(12) United States Patent
Liu (10) Patent No.: US 11,060,640 B2
(45) Date of Patent: Jul. 13, 2021

(54) PIPE CONNECTOR WITH BINDING RINGS

(71) Applicant: ALL GAIN INDUSTRY CO., LTD., New Taipei (TW)

(72) Inventor: Max Liu, New Taipei (TW)

(73) Assignee: ALL GAIN INDUSTRY CO., LTD., New Taipei (TW)

( * ) Notice: Subject to any disclaimer, the term of this patent is extended or adjusted under 35 U.S.C. 154(b) by 292 days.

(21) Appl. No.: 16/295,702

(22) Filed: Mar. 7, 2019

(65) Prior Publication Data

US 2020/0248849 A1    Aug. 6, 2020

(30) Foreign Application Priority Data

Feb. 1, 2019  (TW) .................................. 108201765

(51) Int. Cl.
*F16L 21/06* (2006.01)
*F16L 21/00* (2006.01)

(52) U.S. Cl.
CPC ........... *F16L 21/065* (2013.01); *F16L 21/005* (2013.01)

(58) Field of Classification Search
CPC ... F16L 21/002; F16L 21/005; F16L 27/1017; F16L 27/107

USPC ...... 285/417, 420, 235, 236, 148.26, 148.23
See application file for complete search history.

(56) References Cited

U.S. PATENT DOCUMENTS

2015/0137509 A1* 5/2015 Desjardins .......... F16L 25/0036
285/236

\* cited by examiner

*Primary Examiner* — Aaron M Dunwoody
(74) *Attorney, Agent, or Firm* — Tracy M Heims; Apex Juris, pllc.

(57) ABSTRACT

A pipe connector has a tube and two binding rings. The tube is made from a soft material and forms at least one fixing segment on two ends. The two binding rings are mounted on the two ends of the tube respectively. Each binding ring has at least one locating segment. The amount of the at least one locating segment is equal to the amount of the at least one fixing segment of the tube. The at least one fixing segment engages with the at least one locating segment to fix the binding ring and the tube. Thus, a user only needs to expand the tube to mount the tube onto a water pipe instead of heating it. Alternatively, engaging the fixing segment with the locating segment prevents the binding ring from moving relatively to the tube.

12 Claims, 7 Drawing Sheets

PIPE CONNECTOR WITH BINDING RINGS

BACKGROUND OF THE INVENTION

1. Field of the Invention

The present invention relates to hardware accessories, especially to a connector for water pipes.

2. Description of the Prior Arts

Water pipes are widely used in daily life. Even ordinary users who are not professional plumbers may occasionally handle water pipes at home, showing how indispensable water pipes are in our live. When installing a pipeline, a user has to connect multiple water pipes to each other for conveyance of water, gas, oil, or other fluid substances.

Conventionally, when two water pipes are connected to each other, an end of one of the two water pipes is mounted into an end of the other water pipe tightly, and the two water pipes are fixed together by glue. Specifically, when connecting, the user first heats an end of one of the two water pipes to soften and expand the end by a heat gun or a blowtorch. Next, the user coats glue on an outer surface of an end of the other water pipe. Then, the user mounts the end that is coated with glue into the expanded end of the water pipe and wait until the end cools down and hardens. After the abovementioned steps, the two water pipes are connected to each other tightly and sealed.

However, the abovementioned connecting method has the following disadvantages.

First, the installation is dangerous because the user might be burned by the heat gun or the blowtorch.

Second, if the heating time or the heating temperature is not controlled well, the material structure of the water pipe will be broken and the water pipe will become fragile.

Third, the installation is difficult so is not suitable for non-professional users to work on their own. Because of the two disadvantages above, the installation of water pipes requires experience. As a heat gun or a blowtorch is not normally readily available in every household, the potential time consumption and risks are not worth the efforts compared to directly hiring a plumber.

In summary, the conventional connecting method needs to be improved.

To overcome the shortcomings, the present invention provides a pipe connector to mitigate or obviate the aforementioned problems.

SUMMARY OF THE INVENTION

The main objective of the present invention is to provide a pipe connector that connects two water pipes without any heating progress. The pipe connector is easy to use even for a non-professional and unexperienced user.

The pipe connector has a tube which is made from a soft material. Two ends of the tube are a first end and a second end, respectively. At least one first fixing segment is formed on a surface of the first end. At least one second fixing segment is formed on a surface of the second end. A first binding ring is mounted on the first end of the tube and has at least one first locating segment. The amount of the at least one first locating segment is equal to the amount of the at least one first fixing segment. The at least one first locating segment is engaged with the at least one first fixing segment. The at least one first locating segment and the at least one first fixing segment fix the first binding ring and the tube. A second binding ring is mounted on the second end of the tube and has at least one second locating segment. The amount of the at least one second locating segment is equal to the amount of the at least one second fixing segment. The at least one second locating segment is engaged with the at least one second fixing segment. The at least one second locating segment and the at least one second fixing segment fix the second binding ring and the tube.

For use, two ends of the soft-material tube are mounted around two water pipes respectively, and the first binding ring and the second binding ring tighten the two ends of the tube respectively so that the tube is mounted on the two water pipes tightly. By the abovementioned structure, a user only needs to force and expand the tube which is made from a soft material and mount the tube on the two water pipes instead of processing heating when connecting the two water pipes. Thus, the risk and the requirement of experience in the installation are reduced and the installation becomes manageable for non-professional users to work on their own and reduce cost. In addition, the fixing segments of the tube are engaged with the locating segments of the binding rings in order to prevent the binding rings from moving relatively to the tube. Therefore, screwing the binding ring to tighten the binding ring becomes easier because the binding ring is unmovable. So, the whole installation is much more convenient.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
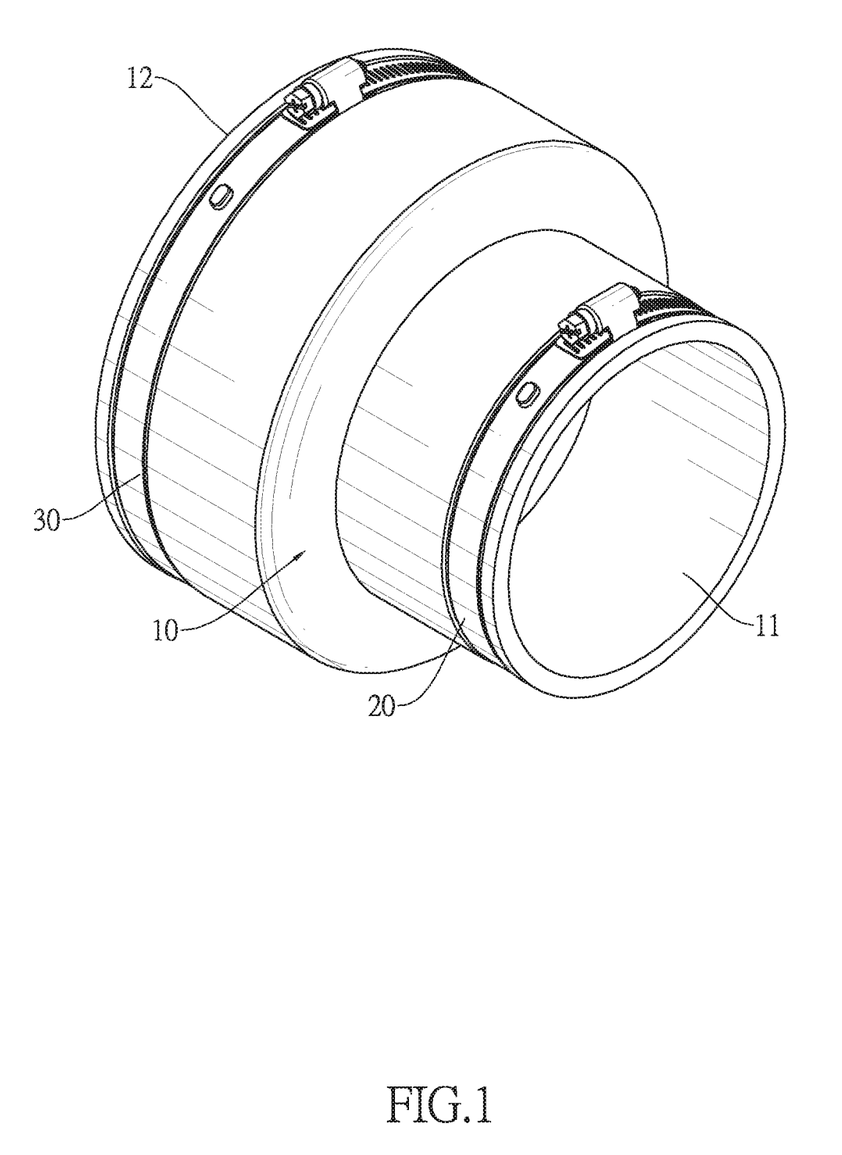
FIG. 1 is a perspective view in the first embodiment of a pipe connector in accordance with the present invention.

With reference to FIG. 1, a pipe connector in accordance with the present invention comprises a tube 10, a first binding ring 20, and a second binding ring 30 in the first embodiment.

Figure 2:
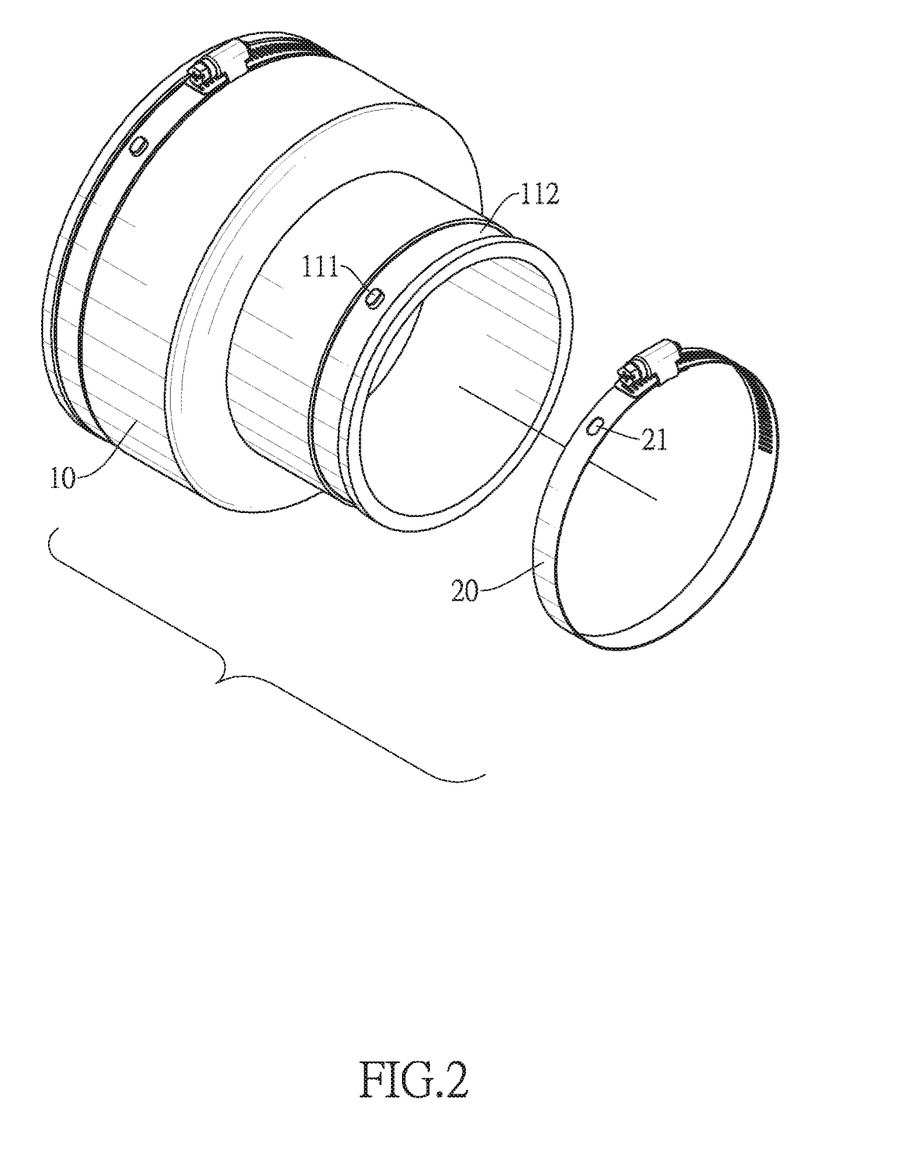
FIG. 2 is an exploded view in the first embodiment of the pipe connector in FIG. 1.
Figure 3:
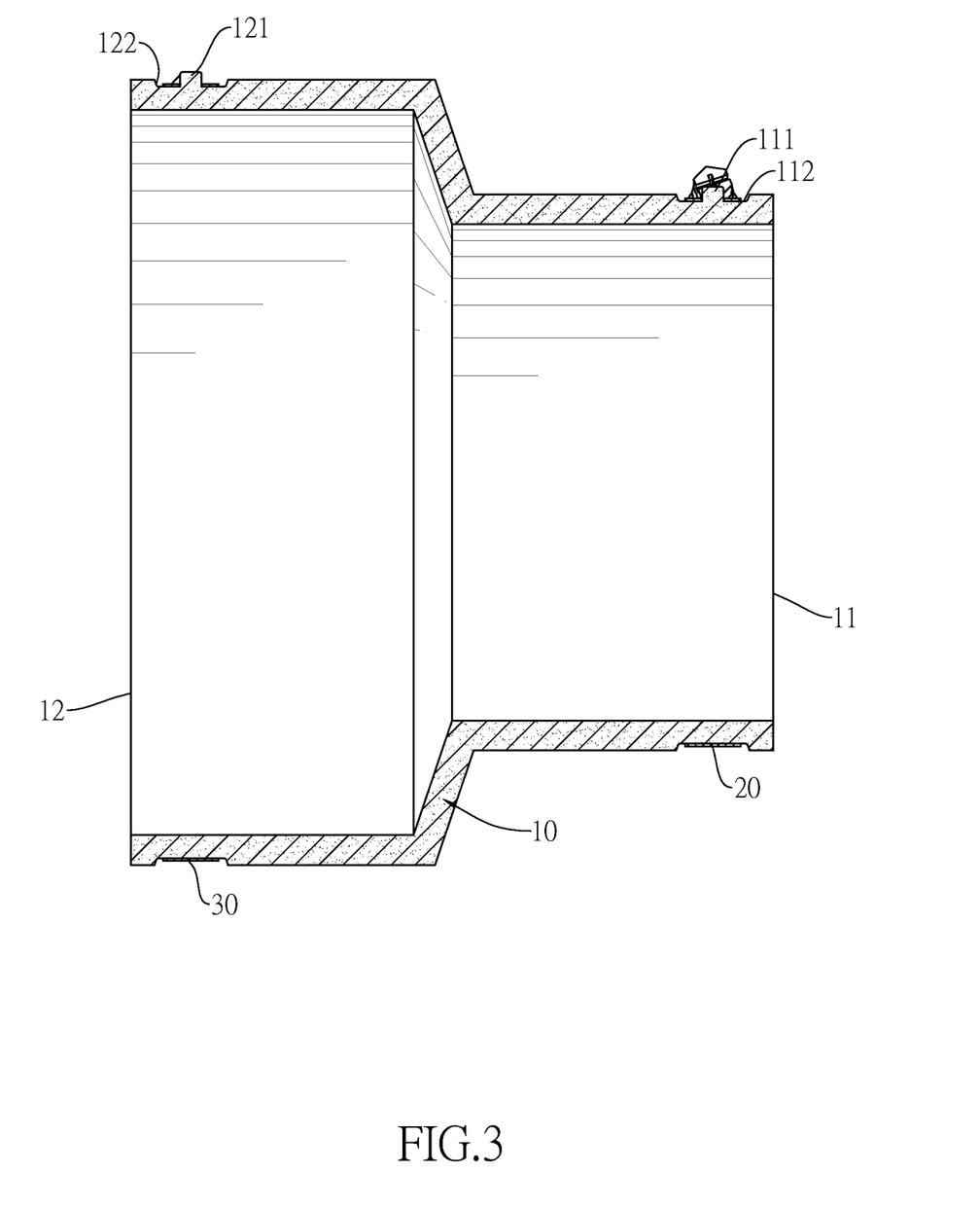
FIG. 3 is a side view in cross section in the first embodiment of the pipe connector in FIG. 1.
Figure 4:
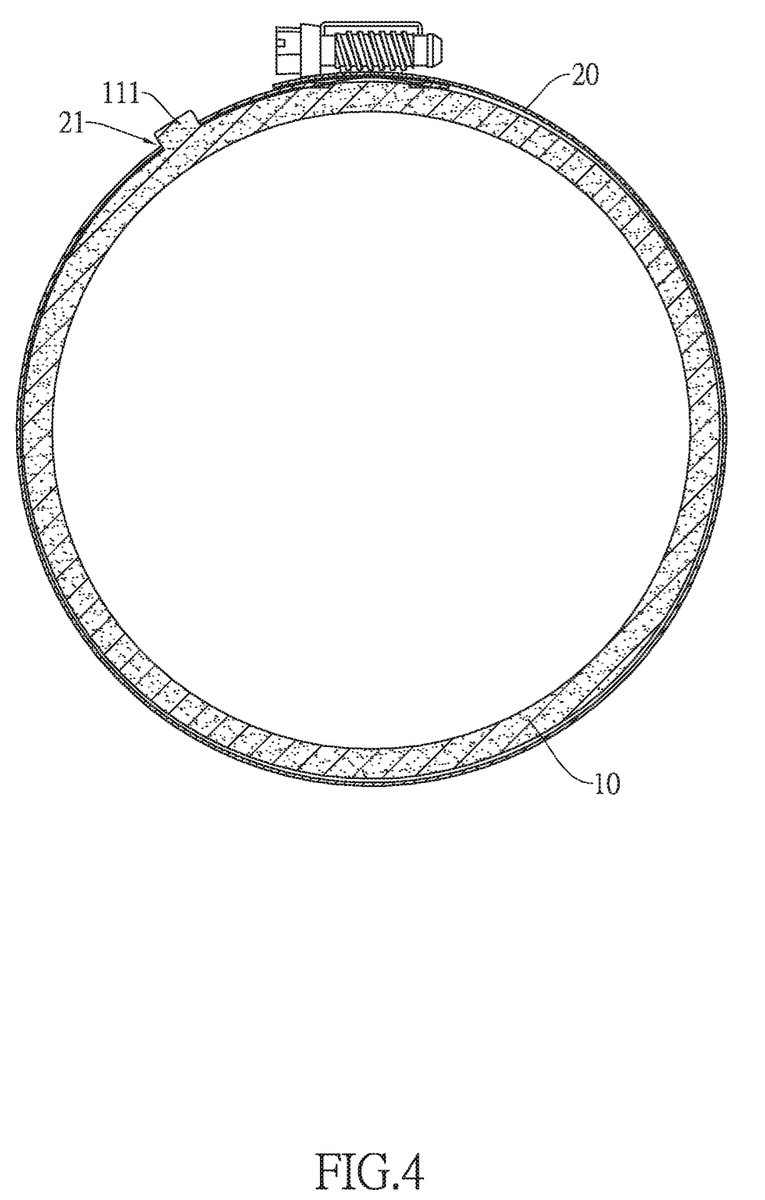
FIG. 4 is another side view in cross section in the first embodiment of the pipe connector in FIG. 1.

With reference to FIGS. 2, 3, and 4, the tube 10 is made from a soft material. Specifically, in the first embodiment, the tube 10 is made from, but not limited to, plastic or rubber. Any material that allows the tube 10 to expand in order to be mounted on a water pipe may be adopted to manufacture the tube 10.

Two ends of the tube 10 are a first end 11 and a second end 12, respectively. At least one first fixing segment 111 is formed on an outer surface of the first end 11, and a first ring groove 112 is further formed on the outer surface of the first end 11 in the first embodiment. At least one second fixing segment 121 is formed on an outer surface of the second end 12, and a second ring groove 122 is further formed on the outer surface of the second end 12 in the first embodiment. The structural configuration of the tube 10 is not limited to the abovementioned, and alternatively only the first end 11 or only the second end 12 forms a groove, or neither the first end 11 nor the second end 12 forms a groove.

In addition, in the first embodiment, an internal diameter of an opening of the first end 11 is smaller than an internal diameter of an opening of the second end 12. But the relationship between the two internal diameters of the first end 11 and the second end 12 is not limited to the abovementioned. The internal diameter of the opening of the first end 11 also can be larger than the internal diameter of the opening of the second end 12, and the two internal diameters of the first end 11 and the second end 12 even can be of a same length, as shown in FIG. 5, illustrating the second embodiment of the present invention.

The first binding ring 20 is mounted on the first end 11 of the tube 10. Specifically, the first binding ring 20 is located in the first ring groove 112, but it is not limited thereto. The first binding ring 20 has at least one first locating segment 21. An amount of the at least one first locating segment 21 is equal to an amount of the at least one first fixing segment 111. In other words, there is one first locating segment 21 corresponding to one first fixing segment 111, or there can also be multiple first locating segments 21 corresponding to multiple first fixing segments 111 (three first locating segments 21 corresponding to three first fixing segments 111, for example). The amount of the first locating segment 21 and the amount of the first fixing segment 111 are not limited to the abovementioned, as long as the two amounts are equal.

The first locating segments 21 engage with the first fixing segments 111 respectively, to fix the first binding ring 20 and the tube 10. That is to say, the first binding ring 20 is non-rotatable about an axis of the tube 10 relative to the tube 10, and the first binding ring 20 is not moveable along the axis of the tube 10 relative to the tube 10. Specifically, in the first embodiment, each one of the first fixing segments 111 is a bump formed on the surface of the first end 11, and each one of the first locating segments 21 of the first binding ring 20 is a hole. Thus, the first fixing segments 111 are mounted in the first locating segments 21 respectively to fix the first binding ring 20 and the tube 10. The structure between the first fixing segments 111 and the first locating segments 21 is not limited to the abovementioned, but also can be the second embodiment as described in the next paragraph.

Figure 5:
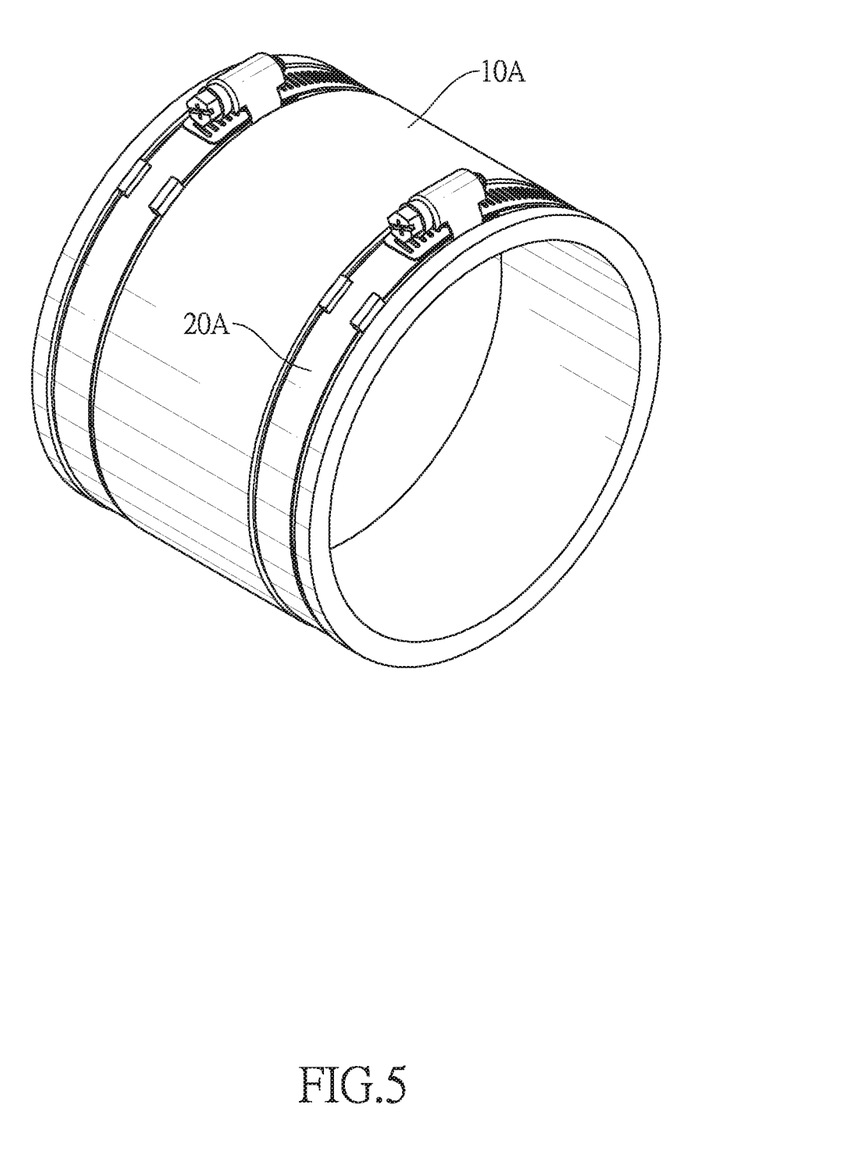
FIG. 5 is a perspective view in the second embodiment of the pipe connector in FIG. 1.

With reference to FIGS. 5 and 4, in the second embodiment, each one of the first fixing segments has two first blocks 1111A. The two first blocks 1111A are formed on the outer surface of the first end. Each one of the first locating segments of the first binding ring 20A has two first notches 211A. The two first notches 211A are formed on two sides of the first binding ring 20A respectively. Specifically, the term "two sides of the first binding ring 20A" means the two sides which are located in two different positions along an axial direction of the first binding ring 20A. In other words, the two first notches 211A are formed on two different annular peripheries of the first binding ring 20A, but the two first notches 211A can be located in a same position or two different positions along the circumferential direction. Besides, the two first blocks 1111A are embedded in the two first notches 211A.

By the abovementioned structure, the second embodiment has a same effect as the first embodiment. But the structure between the first fixing segment and the first locating segment in the second embodiment is not limited to the abovementioned. Alternatively, in the second embodiment, the two first notches 211A are located in a same position along the circumferential direction. That is to say, the two first notches 211A which are formed on the two sides of the first binding ring 20A are corresponding to each other in circumferential angle. In other words, the two first notches 211A are located on a same extension line along an axial direction of the tube 10A, and this also means a linking line between the two first notches 211A and the axial direction of the tube 10A are parallel. The relationship between the two first notches 211A is not limited to the abovementioned, but the two first notches 211A can also be located in two different positions along the circumferential direction.

Figure 6:
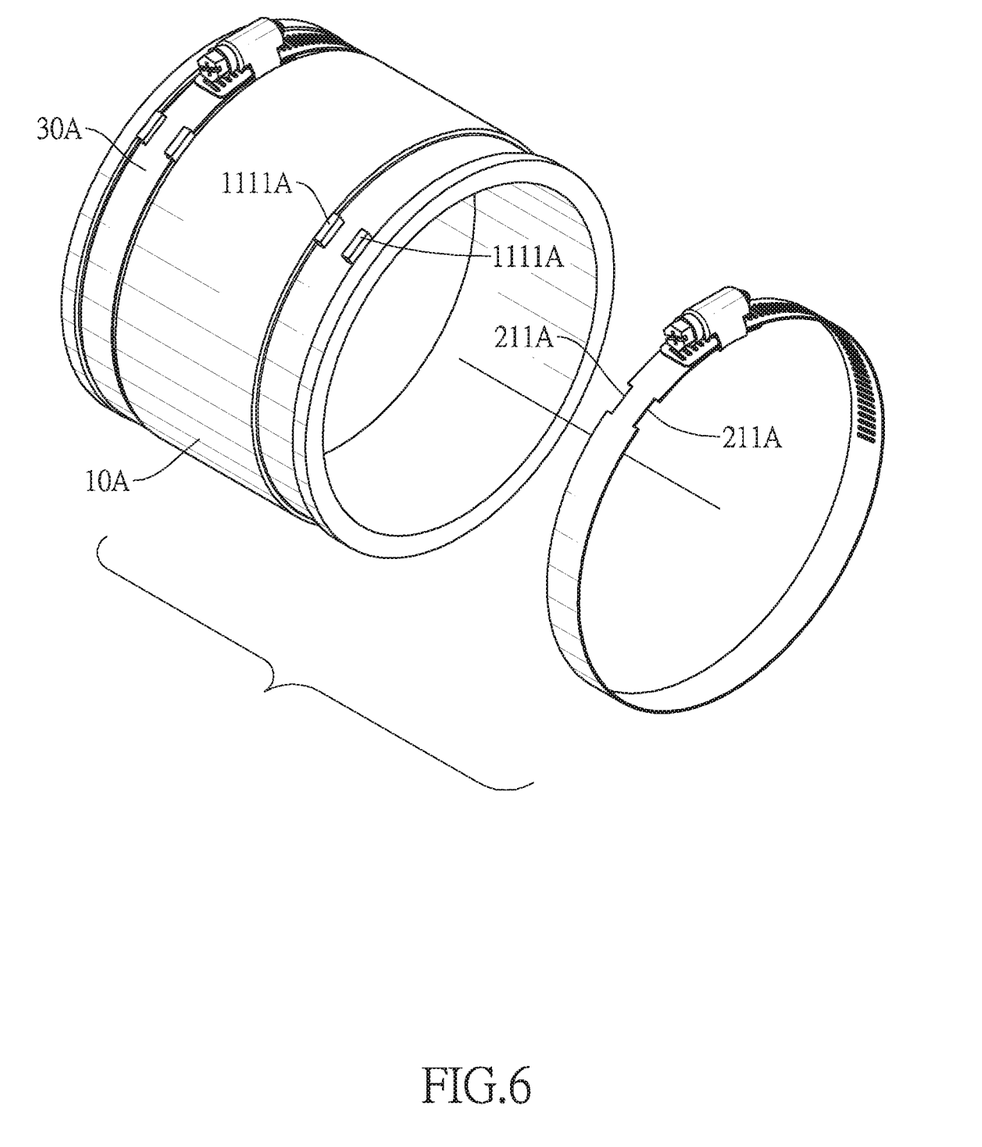
FIG. 6 is an exploded view in the second embodiment of the pipe connector in FIG. 1.

In the first embodiment, the structure of the second binding ring 30 is completely same as the structure of the first binding ring 20. The second binding ring 30 is mounted on the second end 12 of the tube 10, and the second locating segment is configured as a hole to match the second fixing segment 121 configured as a bump, as shown to FIGS. 1 to 4. In the second embodiment, the structure of the second binding ring 30A is also same as the structure of the first binding ring 20A. The second binding ring 30A is mounted on the second end of the tube 10A, and the second locating segment is configured as a notch to match the second fixing segment configured as a block, as shown in FIGS. 5 to 6. But the relationship between the second binding ring 30 and the first binding ring 20 is not limited to the abovementioned. In another preferred embodiment, the structure of the second binding ring 30 can also be different from the structure of the first binding ring 20, and the way that the second binding ring 30 matches the second fixing segment 121 can also be different to the way that the first binding ring 20 matches the first fixing segment 111.

Figure 7:
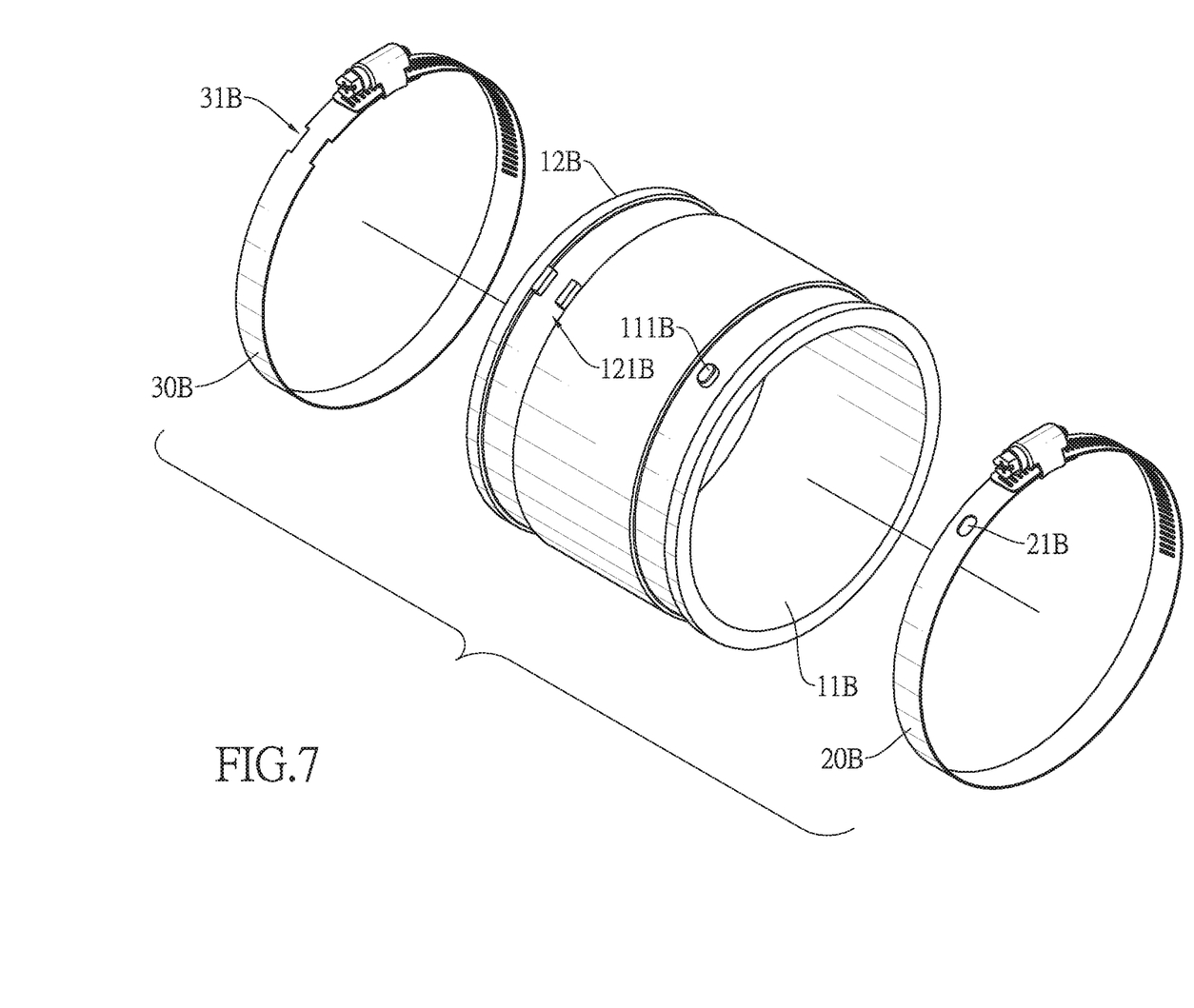
FIG. 7 is an exploded view in the third embodiment of the pipe connector in FIG. 1.

For example, with reference to FIG. 7, in the third embodiment, each one of the first fixing segments 111B is a bump formed on the outer surface of the first end 11B, and each one of the first locating segments 21B of the first binding ring 20B is a hole. The first fixing segment 111B is mounted in the first locating segment 21B. However, each one of the second fixing segments 121B has two second blocks formed on the outer surface of the second end 12B, and each one of the second locating segments 31B of the second binding ring 30B has two second notches formed on the two sides of the second binding ring 30B respectively. The two second blocks are embedded in the two notches respectively.

For use, the first end 11 and the second end 12 of the tube 10 are mounted on two ends of two water pipes respectively, and the first binding ring 20 and the second binding ring 30 are screwed to get tightened. By this, the tube 10 is mounted on the two water pipes tightly by the first end 11 and the second end 12 and the tube 10 is able connect the two water pipes.

By the abovementioned structure, a user only needs to force and expand the soft-material-made tube 10 to mount the tube 10 onto a water pipe without the heating progress. Therefore, the risk and the requirement of experience in the installation are reduced and the installation becomes suitable for ordinary, non-professional users to work on their own in order to reduce cost. In addition, the fixing segments of the tube 10 are engaged with the locating segments of the binding rings 20, 30 in order to prevent the binding rings 20, 30 from moving relatively to the tube 10. Therefore, screwing the binding rings 20, 30 to tighten them becomes easier because the binding rings 20, 30 are unmovable. So, the whole installation is much more convenient.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A pipe connector comprising:
a tube made from a soft material and having
a first end having
at least one first fixing segment; the at least one first fixing segment formed on an outer surface of the first end; and
a second end having
at least one second fixing segment; the at least one second fixing segment formed on an outer surface of the second end;
a first binding ring mounted on the first end of the tube and having
at least one first locating segment; an amount of the at least one first locating segment being equal to an amount of the at least one first fixing segment; the at least one first locating segment engaging with the at least one first fixing segment respectively; the at least one first locating segment and the at least one first fixing segment fixing the first binding ring and the tube; and
a second binding ring mounted on the second end of the tube and having at least one second locating segment; an amount of the at least one second locating segment being equal to an amount of the at least one second fixing segment; the at least one second locating segment engaged with the at least one second fixing segment respectively;
the at least one second locating segment and the at least one second fixing segment fixing the second binding ring and the tube;
wherein
each one of the at least one first fixing segment has two first blocks; the two first blocks are formed on the outer surface of the first end; each one of the at least one first locating segment of the first binding ring has two first notches; the two first notches are formed on two sides of the first binding ring respectively; the two first blocks are embedded in the two first notches respectively; and
each one of the at least one second fixing segment has two second blocks; the two second blocks are formed on the outer surface of the second end; each one of the at least one second locating segment of the second binding ring has two second notches; the two second notches are formed on two sides of the second binding ring respectively; the two second blocks are embedded in the two second notches respectively.

2. The pipe connector as claimed in claim 1, wherein
the two first notches of the first binding ring are located in a same position along a circumferential direction of the first binding ring;
the two second notches of the second binding ring are located in a same position along a circumferential direction of the second binding ring.

3. The pipe connector as claimed in claim 2, wherein a first ring groove is formed on the outer surface of the first end of the tube; the first binding ring is located in the first ring groove.

4. The pipe connector as claimed in claim 3, wherein a second ring groove is formed on the outer surface of the second end of the tube; the second binding ring is located in the second ring groove.

5. The pipe connector as claimed in claim 4, wherein an internal diameter of an opening of the first end of the tube is smaller than an internal diameter of an opening of the second end of the tube.

6. The pipe connector as claimed in claim 5, wherein the tube is made from plastic.

7. The pipe connector as claimed in claim 6, wherein the tube is made from rubber.

8. The pipe connector as claimed in claim 1, wherein a first ring groove is formed on the outer surface of the first end of the tube; the first binding ring is located in the first ring groove.

9. The pipe connector as claimed in claim 1, wherein a second ring groove is formed on the outer surface of the second end of the tube; the second binding ring is located in the second ring groove.

10. The pipe connector as claimed in claim 1, wherein an internal diameter of an opening of the first end of the tube is smaller than an internal diameter of an opening of the second end of the tube.

11. The pipe connector as claimed in claim 1, wherein the tube is made from plastic.

12. The pipe connector as claimed in claim 1, wherein the tube is made from rubber.

* * * * *